US008032639B2

(12) United States Patent
King et al.

(10) Patent No.: US 8,032,639 B2
(45) Date of Patent: Oct. 4, 2011

(54) APPARATUS AND METHOD FOR PROVIDING DATA SESSION SOURCE DEVICE INFORMATION

(75) Inventors: Matthew Lawrence King, Hampshire (GB); Frank Brockners, Köln (DE); Richard Mandred Pruss, Queensland (AU); Wayne Roiger, Golden Valley, MN (US)

(73) Assignee: Cisco Technology, Inc., San Jose, CA (US)

( * ) Notice: Subject to any disclaimer, the term of this patent is extended or adjusted under 35 U.S.C. 154(b) by 1045 days.

(21) Appl. No.: 11/439,930

(22) Filed: May 23, 2006

(65) Prior Publication Data

US 2007/0276957 A1 Nov. 29, 2007

(51) Int. Cl.
*G06F 15/16* (2006.01)
*G06F 15/173* (2006.01)
*H04L 12/28* (2006.01)
(52) U.S. Cl. .................. 709/227; 709/238; 370/351
(58) Field of Classification Search .................. 709/227, 709/238; 370/351
See application file for complete search history.

(56) References Cited

U.S. PATENT DOCUMENTS

| 6,563,824 | B1* | 5/2003 | Bhatia et al. | 370/392 |
| 7,003,574 | B1* | 2/2006 | Bahl | 709/228 |
| 2002/0049840 | A1* | 4/2002 | Squire et al. | 709/225 |
| 2003/0007486 | A1* | 1/2003 | March et al. | 370/389 |
| 2003/0084162 | A1* | 5/2003 | Johnson et al. | 709/227 |
| 2003/0106067 | A1* | 6/2003 | Hoskins et al. | 725/119 |
| 2003/0108052 | A1* | 6/2003 | Inoue et al. | 370/399 |
| 2006/0062203 | A1* | 3/2006 | Satapati | 370/352 |

OTHER PUBLICATIONS

Information Sciences Institute, University of Southern California, "Transmission Control Protocol DARPA Internet Program Protocol Specification," (IETF RFC 793), Sep. 1981, pp. 1-77.

\* cited by examiner

*Primary Examiner* — Ranodhi Serrao
(74) *Attorney, Agent, or Firm* — Hickman Palermo Truong & Becker LLP (57) ABSTRACT

A community translation service device for providing a translation service to a community of at least one source device is arranged to receive data traffic from a source device in the community. The traffic includes a native data session identifier and, as a source identifier, a source device identifier. The community translation service device comprises a translation component and a database for storing a pool of assigned data session identifiers associated with the source device. The translation component is arranged to translate the native data session identifier to an assigned data session identifier associated with the source device, the community translation service device further being arranged to forward the data traffic including the assigned data session identifier as data session source device information to a service aggregation device.

19 Claims, 6 Drawing Sheets

| CONNECTION 400 | INPUT PORT 402 | INPUT SOURCE ADDRESS 404 | OUTPUT PORT 406 | OUTPUT SOURCE ADDRESS 408 |
|---|---|---|---|---|
| 100-102 | 1024 | IP1 | 1101 | IPCPE |
| 118-102 | 1024 | IP2 | 1034 | IPCPE |
| 100-116 | 1025 | IP1 | 1042 | IPCPE |
| 118-116 | 1025 | IP2 | 1106 | IPCPE |

FIG. 1

| 200 SOURCE ADDRESS | 202 TCP SOURCE PORT | 204 DESTINATION ADDRESS | 206 TCP DESTINATION PORT | 208 PAYLOAD |
|---|---|---|---|---|

| CONNECTION 400 | INPUT PORT 402 | INPUT SOURCE ADDRESS 404 | OUTPUT PORT 406 | OUTPUT SOURCE ADDRESS 408 |
|---|---|---|---|---|
| 100-102 | 1024 | IP1 | 1101 | IPCPE |
| 118-102 | 1024 | IP2 | 1034 | IPCPE |
| 100-116 | 1025 | IP1 | 1042 | IPCPE |
| 118-116 | 1025 | IP2 | 1106 | IPCPE |

| CONNECTION 400 | INPUT PORT 402 | INPUT SOURCE ADDRESS 404 | OUTPUT PORT 600 | OUTPUT SOURCE ADDRESS 408 |
|---|---|---|---|---|
| 100-102 | 1024 | IP1 | 1024 | IPCPE |
| 118-102 | 1024 | IP2 | 1040 | IPCPE |
| 100-116 | 1025 | IP1 | 1025 | IPCPE |
| 118-116 | 1025 | IP2 | 1041 | IPCPE |

FIG. 6

| SOURCE ADDRESS | TCP PORT | USER DEVICE |
|---|---|---|
| IPCPE | 1024-1039 | IP1' |
| IPCPE | 1040-1055 | IP2' |

APPARATUS AND METHOD FOR PROVIDING DATA SESSION SOURCE DEVICE INFORMATION

FIELD OF THE INVENTION

The present invention generally relates to providing data session information. The invention relates more specifically to an apparatus and method for providing data session source device information, for example a community translation service device.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In order to access a network such as the Internet a user device such as a personal computer (PC), set top box or Voice Over Internet Protocol (VoIP) telephone typically obtains access through customer premises equipment (CPE). One or more CPE's communicate with a gateway to the network such as an aggregation device in the form of a broadband remote access server (BRAS). The aggregation device obtains and applies a policy to communication between the user device and the Internet ensuring for example that the user device is authorised, that an appropriate quality of service (QoS) such as bandwidth is applied and that an appropriate billing method is applied.

Figure 1:
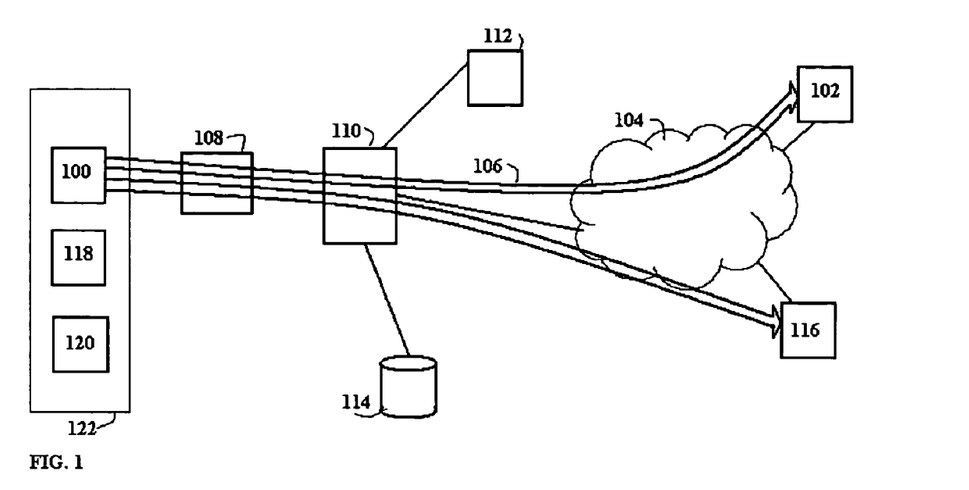
FIG. 1 is a block diagram showing the components of an illustrative network.

Typical operation can be further understood with reference to FIG. 1 which is a high level diagram illustrating a network of the type described above. A first user device 100 initiates a data session with a first remote destination device 102 which can for example be a remote host or service reachable via the Internet designated generally 104. The data session can be any appropriate data session such as a transmission control protocol (TCP) connection including, as a source identifier, a source IP address of the user device 100 and as destination identifier the IP address of the remote entity 102, and the data session is designated generally 106.

The user device 100 communicates with services on the Internet provided on remote device 102 via a CPE device 108 which in turn communicates with an aggregation device 110 which in turn communicate with further aggregation devices and/or Internet core devices. The aggregation device 110 communicates with a management device or portal such as a subscriber edge service manager (SESM) 112 which returns user device information which can be used by the aggregation device to then obtain the associated policy from a policy server such as an authorization, authentication and accounting (AAA) server 114. This is handled during a service session between the user device 100 and the aggregation device 110 which, once set up, allows the user device 100 to carry out multiple data sessions, for example a further data session with a second remote device 116.

Figure 2:
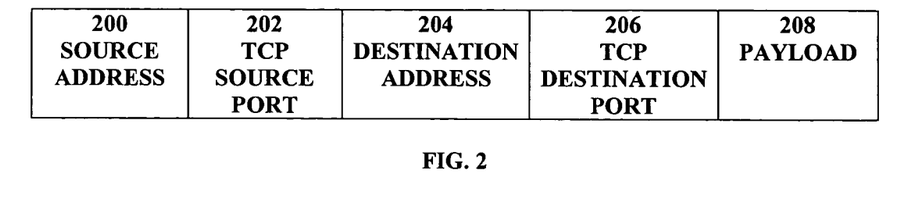
FIG. 2 is a schematic diagram showing the header and payload of a data packet.
Figure 3:
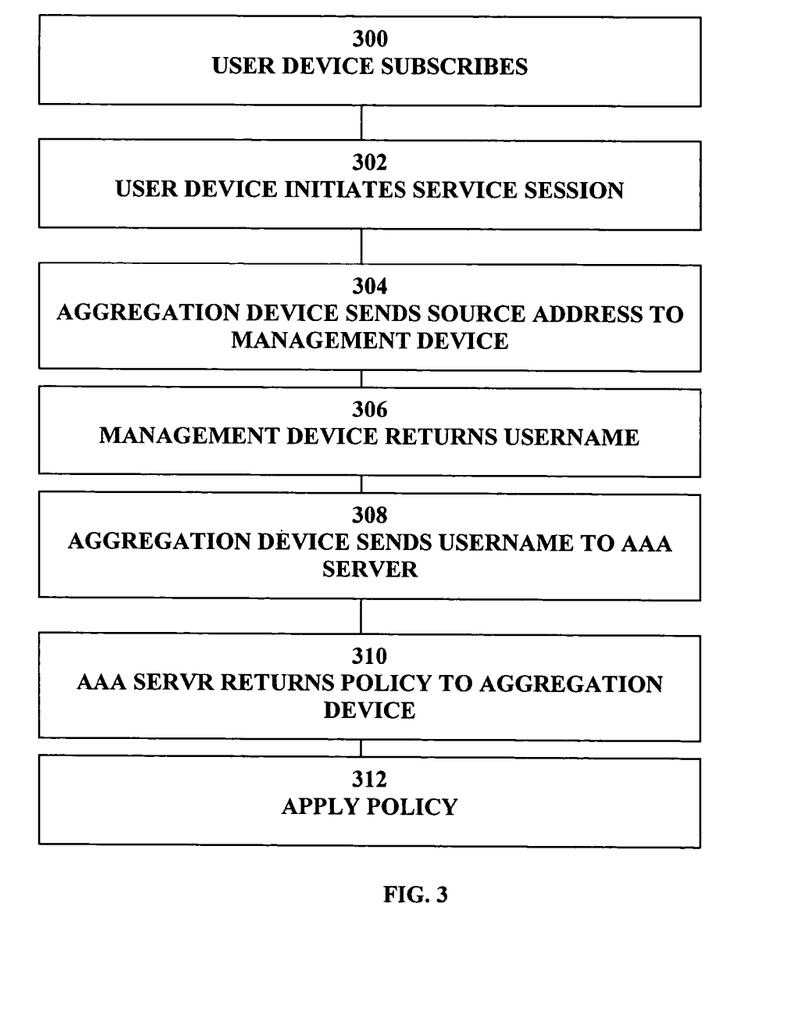
FIG. 3 is a flow diagram illustrating the steps in a conventional control session setting up a service session.

FIG. 2 shows aspects of a typical data session packet corresponding to traffic within a TCP connection. The packet includes in its header a source identifier field 200 with a source device identifier such as the user device 100 IP address. In field 202 a data session identifier comprises for example a native data session identifier such as the TCP source port. Field 204 comprises the IP address of the remote device 102 as destination address. Field 206 similarly identifies the TCP destination port and field 208 carries the data or payload associated with the packet.

Where a CPE serves a single user device then management of a session can be further understood with reference to FIG. 3 which is a flow diagram illustrating the steps involved in initiating communication between a user device 100 and a remote device 102. Initially at step 300 the user device subscribes with the service aggregation device and a data session control identifier such as a user name is assigned or selected for the user, an associated service session control function such as an appropriate policy being stored against the user name in the AAA server.

At step 302 the user device 100 initiates an explicit service session with the aggregation device 110. This can occur, for example, when a user logs on to the user device and requests Internet access. At step 304 the aggregation device 110 needs to retrieve the data session control identifier associated with the user. In particular the aggregation device receives limited information from the user device identifying it, namely the source device IP address. As mentioned above, in order to obtain the policy for the user device, however, the user name is required as data session control identifier. Hence the aggregation device at step 304, sends the source address to the management device 112.

One known approach for this step is described in U.S. Pat. No. 6,983,332 of Lou et al., "Port-bundle host-key mechanism," commonly assigned herewith and incorporated herein by reference for all purposes as if fully set forth herein. According to the approach described in Lou et al., where an aggregation device handles multiple CPEs there is a risk of reuse of a common IP address, use of a non-recognised local address space between the aggregation device and the portal or of multiple aggregation devices communicating with a portal. Lou et al. addresses these issues by replacing the source port number and source port address with an aggregation device assigned port number and address associated with the CPE source address. The replacement port number and source address are sent to the management device which maintains a table and returns the correct user name.

Reverting to FIG. 3, at step 306 the management device returns a data session control identifier recognizable by the AAA server such as a user name and at step 308 the aggregation device sends the user name to the AAA server. At step 310 the AAA server retrieves the policy associated with the user name for service session control and returns this to the aggregation device. At step 312 the aggregation device 110 applies the policy to the service session permitting data sessions between the user device and remote entities.

In most instances the CPE 108 serves a plurality of user devices 100, 118, 120 forming a community of source devices 122. In this case it is known for the CPE to act as a community translation service device. In particular because a local address space may be introduced between the CPE and the community 122 of devices, the addresses may not be recognizable to external devices as the aggregation device 110. In particular, as can be seen with reference to FIG. 4 which is a translation table implemented by the CPE and FIG. 5 which is a flow diagram illustrating translation steps performed by the CPE, the CPE swaps the user device source address for a CPE assigned translated source identifier which acts as an "overloaded" IP address serving multiple user devices.

Figure 5:
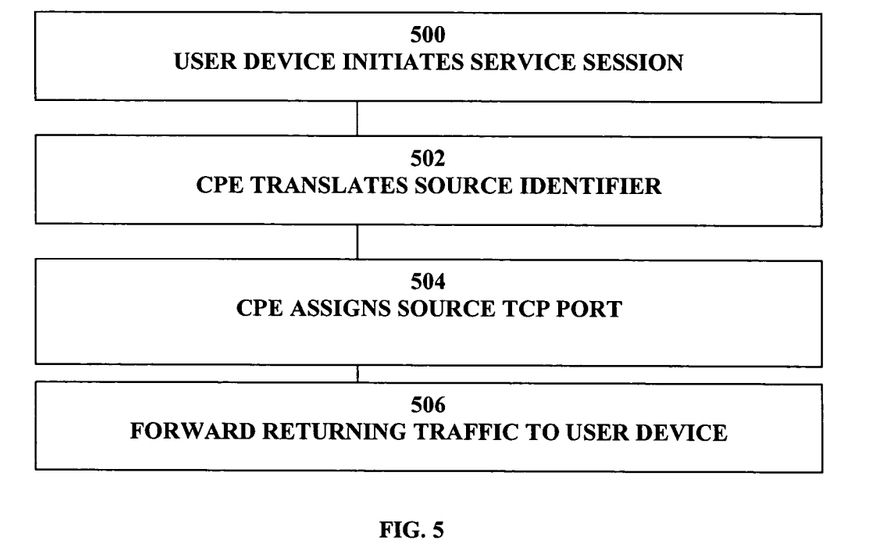
FIG. 5 is a flow diagram illustrating the steps involved in port address and source address translation at the CPE.

In particular at step 500 the user device initiates a service session with its IP address as source identifier and a native data session identifier such as a TCP source port as data session identifier. At step 502 the CPE translates the source address to its own overloaded IP address. At step 504 the CPE additionally translates the TCP source port to its own TCP port in a Port Address Translation (PAT) step as described in more detail below. Then, as step 506, the CPE forwards returning traffic with the translated overloaded IP address and TCP port to the user device, reinstating the user device IP address as destination address and the user device assigned TCP port number.

Figure 4:
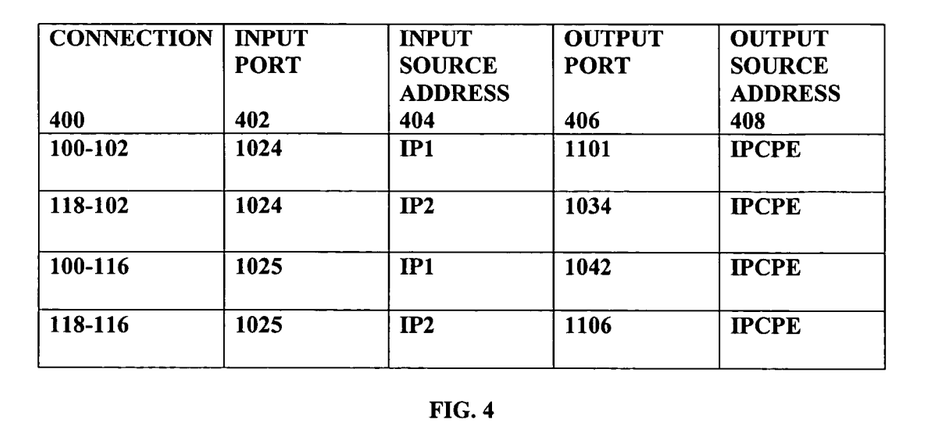
FIG. 4 is a table showing source address and port address translation at a CPE.

A corresponding assignment scheme can be understood with reference to FIG. 4. Where, for example, the first user device 100 initiates a data session with the first remote device 102 it will use its IP address as source address and will also assign a TCP source port number, for example 1024. If a second user device 118 initiates a data session then it will similarly assign its IP address as source address and its own TCP source port which may be the same as that assigned by the first user device, as the session is between different entities. As a result both user devices 100 and 118 may have individual TCP connections with a first remote device 102 using different source addresses but the same TCP port. In a similar manner the respective user devices 100, 118 may also set up TCP connections with a second remote device 116 again with their respective source addresses but with the same TCP port 1025 assigned. As discussed above, the CPE 108 will replace the source address with its own overloaded IP address. In addition, however, in order to be able to distinguish the data sessions it will replace the natively assigned data session identifier, that is the TCP source port, with an assigned data session identifier such as a TCP port number pulled from a pool of available, non-assigned port numbers.

Referring to FIG. 4, therefore, it will be seen that where a data session has an input TCP port 1024 (column 402) and an input source address (column 404) of IP1 (for the first user device 100 connecting to the first remote device 102) and another data session has a TCP port 1024 and IP2 (for the second user device 118) then the CPE will assign an output port (column 406), say 1101, 1034 respectively corresponding to the connection and having an output source address (column 408) comprising the CPE address IPCPE. For purposes of clarity the corresponding connection is shown in column 400. Further connections between the first and second user device and second remote device 116 are shown with CPE assigned TCP port numbers 1042, 1106.

This approach is known as port address translation (PAT) and it will be seen that PAT obscures the identity of the host or user device. As a result where the IP addresses of multiple user devices such as PC's are translated to a single, overloaded IP address, with source ports assigned on a first-come-first-served basis across the connected PC's, it is not possible for a provider edge device such as an aggregation device to classify incoming packets as belonging to a particular host or user device without additional information being provided, typically through the application layer, for example through the use of HTTP cookies.

Hence the aggregation device must apply a common policy for all user devices within the community 122 served by the CPE 108. However this can give rise to various problems. Where the community comprises, for example, a domestic residence with multiple PC's used by different family members then it may be desirable to apply different policies to the different devices in order to exert parental control on content. Furthermore different devices may wish to use different ISP's. A further problem arises in the case of "triple play" where respective user devices comprise a PC having a data connection, a set top box requiring media content and a VoIP telephone requiring low latency connectivity. In addition or alternatively a security camera may have Internet connectivity. In that case it can be seen that different policies need to be applied for each device. More generally, additional flexibility is required in the application of policies to multiple user devices in a common community.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing data session source device information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method and Apparatus for providing data session source device information
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a community translation service device for providing a translation service to a community of at least one source device. The community translation service device is arranged to receive data traffic from a source device in the community, said traffic including a native data session identifier and, as a source identifier, a source device identifier. Said community translation service device comprises a translation component and a database for storing a pool of assigned data session identifier associated with said source device. The translation component is arranged to translate said native data session identifier to an assigned data session identifier associated with the source device. The community translation service device is further arranged to forward said data traffic including said assigned data session identifier as data session source device information to a service aggregation device.

In other aspects, the invention encompasses a computer apparatus and a computer-readable medium configured to carry out the foregoing steps.

2.0 Structural and Functional Overview

Figure 6:
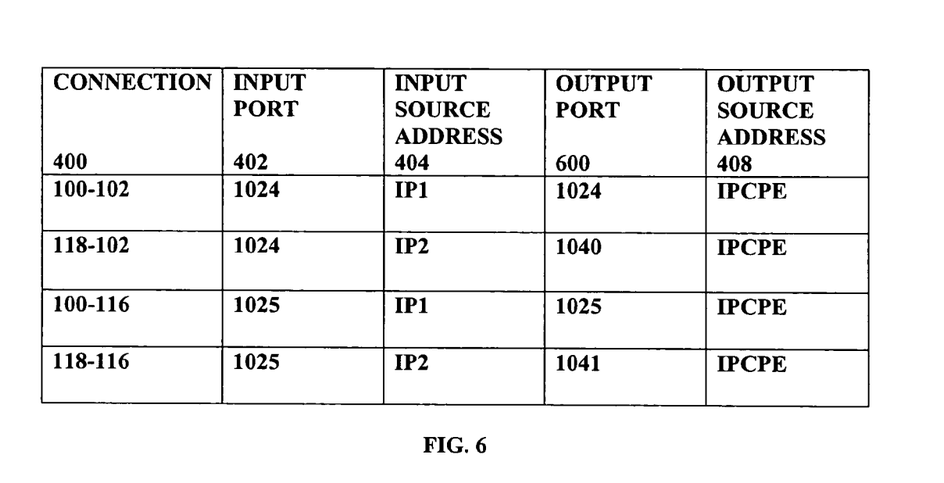
FIG. 6 is a table showing assignment at a CPE of dedicated source port numbers.

In overview the method and apparatus described herein provides additional data session source device information for identification of the user device at a service (or session) aggregation device which aggregates source host sessions such that the service aggregation device can ensure that a per-user device policy is applied. In particular, referring to FIG. 1 additional components which do not constitute the prior comprise a translation component 124 for providing the relevant information at the community translation service device or CPE from a database 126 the contents of which are shown in more detail in FIG. 6 which is a table showing the source and port information assigned according to the method described herein. The table of FIG. 6 corresponds generally to the table of FIG. 4 and so common reference numerals are used in both cases. However it will be seen that the TCP ports assigned in the output port column 600 are changed. In particular the native data session identifier in the form of the originally assigned TCP port is mapped by a translation component to an assigned data session identifier from a pool of port numbers stored in a database and associated with the respective source device. For example the CPE may assign TCP port numbers 1024 to 1039 to data sessions associated with the first user or source device 100 and TCP port numbers 1041 to 1054 to data sessions associated with the second user or source device 118. As a result, rather than performing conventional PAT, where outside source ports are assigned indiscriminately across inside PC's, translation is carried out to separate port ranges per host device.

Figure 7:
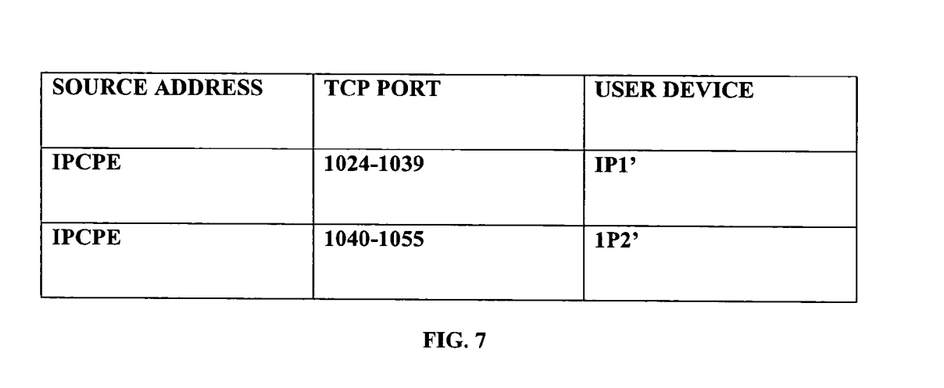
FIG. 7 is a table showing an associated assignment at an aggregation device.

At the service aggregation device such as an intelligent services gateway incoming packets can then be classified by a component to IP sessions based on source port range using a database storing a pool of assigned source ports and connecting user device IP addresses as can be seen from FIG. 7 which is a table indicating how source device identifier information can be derived from a received packet. In particular on receipt of a packet with (translated) source address IPCPE and (translated) TCP port in the range 1024 to 1039 the aggregation device derives corresponding source device information. The information may comprise the source device identifier as the IP address of user device 100, IP1 or an internally assigned identifier IP1 which has a mapping to the user name. Similarly if the port address is in the range 1040 to 1055 then the user device address is identified as IP2 or another mappable identifier/IP2. As a result the correct user device information in the form of an identifier or address can be forwarded to a portal such as a management device which can then return the user name or other application layer identifier associated with the session from the address or mapping allowing the correct policy to be obtained from the AAA server.

3.0 Method for Providing Data Session Source Device Information

Figure 8:
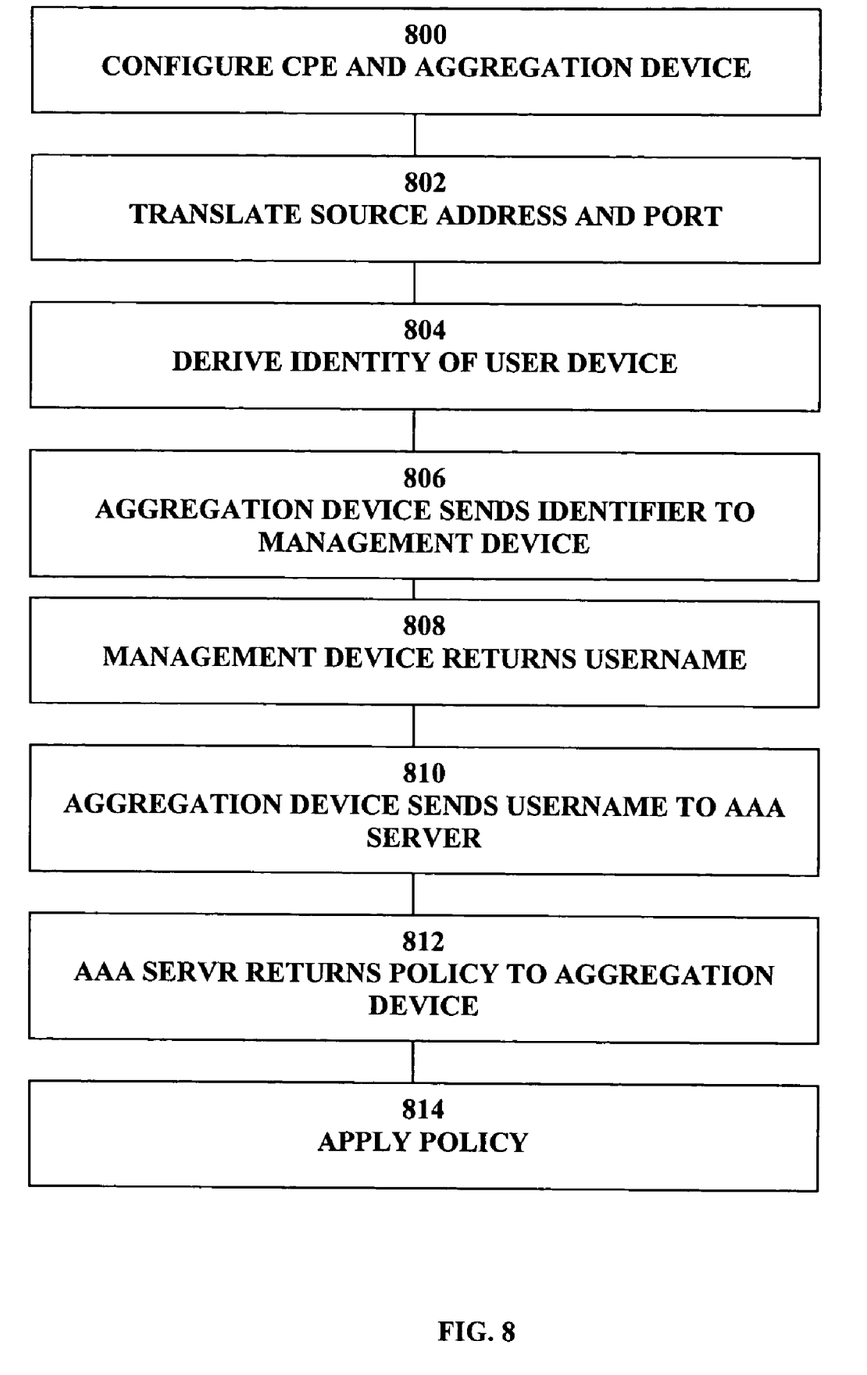
FIG. 8 is a flow diagram showing derivation of a source device identifier at an aggregation device.

The apparatus and method described herein can be understood in more detail with reference to FIG. 8 which is a flow diagram illustrating in more detail the steps involved in implementing the method. At step 800 the CPE and aggregation device are configured with the port ranges per user device to form the table shown at FIG. 6 and FIG. 7. For example they can be configured in any appropriate manner for example manually by the network administrator. At step 802, upon receipt of a packet from a user device the CPE translates the source address and source port. It will be noted that any form of assignment of IP address can be used for example PPP (point to point protocol) or DHCP (dynamic host configuration protocol). At step 804 the aggregation device derives the data session source device information in the form of the original source or user device IP address or other identifier for example from the table at FIG. 7 based on the range in which the received TCP port number falls and, in the event that the CPE may use multiple outside source addresses, the received source device identifier in combination. At step 806 the aggregation device sends the source address or other identifier to the management device such as an SESM which, at step 808, returns the user name associated with the user device. The aggregation device sends the user name to the AAA server at step 810 and the server returns the associated policy to the aggregation device at step 812 allowing the policy to be applied at step 814. Instead of user name other data session control identifier information such as a telephone number or Media Access Control (MAC) address may be used.

Of course any appropriate range can be selected for the port numbers, and the size of the range can be determined, for example, by identifying the maximum number of components available within a community. For example with a maximum community limit of 31 IP devices the TCP port space would allow for approximately 2000 ports per host device which is significantly larger than the actual number of ports likely to be required at any time. A benefit of using such a fixed range size, taking advantage of the smaller community behind a single CPE, is that the need for explicit signaling between two devices is removed. In particular, if common ranges are used across all devices then the CPE and BRAS do not need to communicate the port range size information between one another as this is predetermined.

It will be appreciated that the approach can be described in relation to any data session including, but not limited to TCP connections. For example the approaches can be applied to connectionless sessions such as Universal Datagram Protocol (UDP) or Simple Control Transport Protocol (SCTP). In that case the UDP port number can similarly be translated to a pre-determined range associated with a specific source device. More generally the approach can be applied to, for example, any layer 4 transport mechanism identifiable by its port number or a similar data session identifier and supporting address translation preserving the layer 3 device distinction at layer 4 through a device performing PAT. As a result network bound subscriber traffic can preserve a subscriber reference for the lifetime of a session and an upstream device such as an aggregation device has the ability to distinguish incoming packets from different PC's behind a PAT translation point with looking deeper into the packet than the IP header and avoiding the need for and associated overhead of stateful inspection.

Indeed it will be seen that even where source IP address translation does not take place then the approach described herein will still allow identification of the user device party to a data session even if the user device address is not recognized at the aggregation device. In either case, since all address or port translation is performed at the CPE device, no such translation or deep packet inspection overheads need to be incurred at the aggregation device itself. Of course mapping of the assigned port address to the corresponding user device address can be performed remotely from the aggregation device rather than at the aggregation device itself where the latency overheads are not unacceptable.

It will be seen that the various steps described herein can be performed at the CPE/aggregation device without significant extension of existing tasks and capabilities, with simple additional coding to allow translation to and from a mapped range on the data plane. The method steps can be coded or implemented in any manner as will be apparent to the skilled read. For example an appropriate session can be derived for which the classification criteria are a combination of TCP, SCTP, UDP or other type of port range and IP address and the ports of source port ranges can be populated.

The apparatus and method can be implemented by any vendor in access and aggregation employing the mechanism at the CPE device and aggregation device. It can be seen that the approach can be applied in a range of business implementations including, for example, in any appropriate manner, for example in a dedicated session between the CPE and BRAS applying different policies to user devices in a common community for the purposes of access or media content control, application of different policies for triple—play security cameras, PDA or mobile telephone, or provision of access to multiple ISP's for devices in a common community.

In addition the approach can be implemented at the ingress edge of an enterprise which can require overloaded IP address translation in the situation where an Intranet has multiple Enterprises connecting together. In this case many of the enterprises may be using the same private IP address ranges, as only a few of those exist and they are meant to overlap as the networks are administered as though private. In this case this identity-based translation may be used to identify which enterprise a particular transaction is coming from.

4.0 Implementation Mechanisms—Hardware Overview

Figure 9:
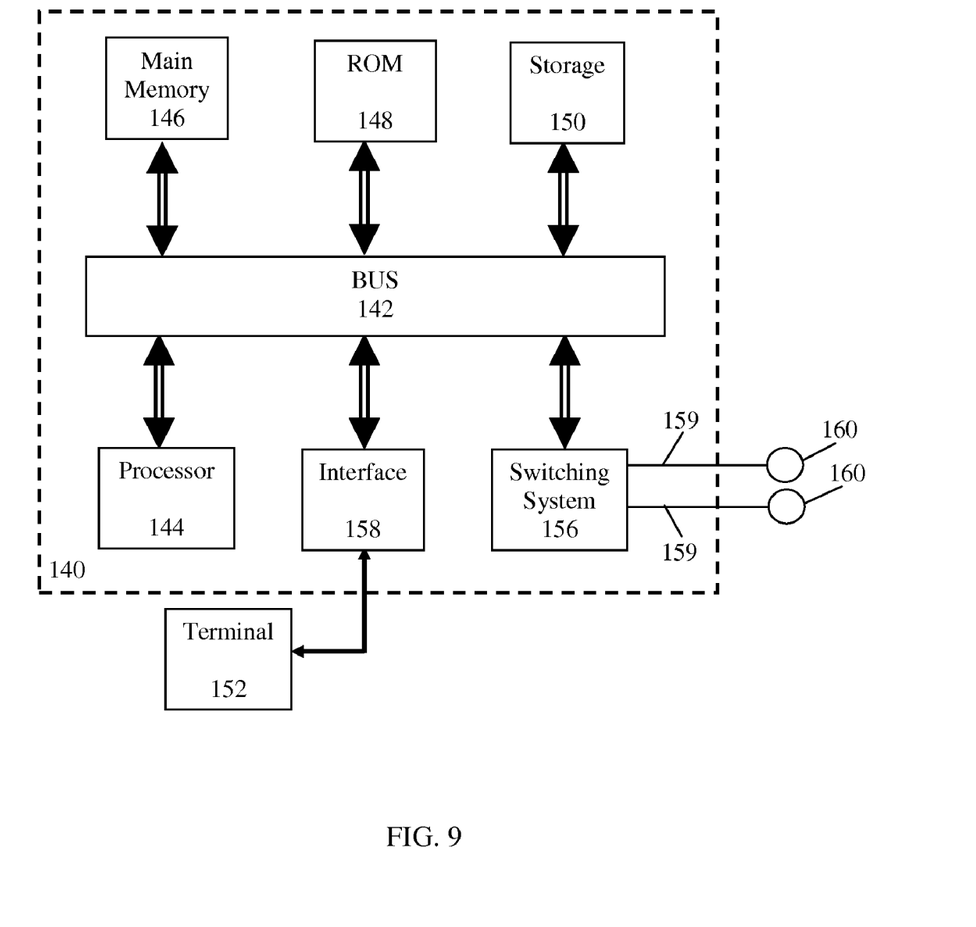
FIG. 9 is a block diagram illustrating a computer system upon which a method of providing data session source device information may be implemented.

FIG. 9 is a block diagram that illustrates a computer system 140 upon which the method may be implemented. The method is implemented using one or more computer programs running on a network element such as a router device. Thus, in this embodiment, the computer system 140 is a computer connected to a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a community translation service or service aggregation device the above described method of identifying a policy server. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

Any appropriate communication protocol and mechanism can be adopted to implement the invention. The method steps set out can be carried out in any appropriate order and aspects from the examples and embodiments described juxtaposed or interchanged as appropriate.

The approaches can be performed in relation to any type of source or user device and any community translation service device including but not limited to a CPE, and any appropriate aggregation device for example a BRAs such as an intelligent services gateway, subscriber service gateway (SSG. Any appropriate management device such as a subscriber edge service manager (SESM) or equivalent portal may be employed and any appropriate AAA server or other data session control or policy management system can be used.

Although a single IP address is assumed assigned to a single user device of course multiple IP addresses may be assigned in which the steps described above can be altered accordingly and IP addresses can be assigned at each stage of the process in any appropriate manner. The community of devices and CPE can be implemented in any appropriate environment such as domestic premises, office premises, small office home office (SOHO) environments as well as at the security edge of an enterprise for example for implementation of access control list (ACLs).

What is claimed is:

1. An apparatus for providing data session source device information, the apparatus comprising:
   one or more processors;
   a network interface communicatively coupled to the one or more processors and configured to communicate digital data among the one or more processors in the network; and
   a computer readable volatile or non-volatile storage medium storing one or more sequences of instructions for providing data session source device information which, when executed by the one or more processors cause the one or more processors to perform:
   storing a plurality of data session identifiers that can be selected to be associated only with a particular source device and not with any other device;
   receiving data traffic from the particular source device, said traffic comprises a native data session identifier and, as a source identifier, a source device identifier;
   based on the source device identifier of the particular source device that sent the data traffic, selecting a particular data session identifier from the plurality of data session identifiers that can be associated only with the particular source device and not with any other device;
   translating said native data session identifier to the particular data session identifier; and
   forwarding said data traffic including the particular data session identifier as the data session source device information to a service aggregation device;
   wherein said native data session identifier comprises a source port number;
   wherein said particular data session identifier comprises a port number.

2. An apparatus as recited in claim 1 in which, by executing said instructions, said data session source device information is useable to identify a policy associated with a source device data session.

3. An apparatus as recited in claim 2 in which, by executing said instructions, the policy is used for one of assigning different QoS to different sessions, distinguishing between ISP's for respective source devices, security ACLs or media content control.

4. The apparatus of claim 1, further comprising instructions, which when executed cause translating said source device identifier to a translated source identifier as the source identifier.

5. The apparatus of claim 1, comprising customer premises equipment.

6. The apparatus of claim 1, wherein the source identifier comprises a source device internet protocol (IP) address.

7. The apparatus of claim 1, wherein the data session comprises any one of: a transmission control protocol (TCP) connection; a simple control transport protocol (SCTP) association; and a universal datagram protocol (UDP) session.

8. The apparatus of claim 1, further comprising a community of source devices that comprises any one of a personal computer (PC); a voice over internet protocol (VoIP) phone; a set-top box; a security camera; a personal digital assistant (PDA) and a mobile telephone.

9. An apparatus for providing data session source device information, the apparatus comprising:
   one or more processors;
   a network interface communicatively coupled to the one or more processors and configured to communicate digital data among the one or more processors in the network; and
   means for storing a plurality of data session identifiers that can be selected to be associated only with a particular source device and not with any other device;
   means for providing data session source device information by receiving data traffic from the particular source device, said traffic comprising a native data session identifier and, as a source identifier, a source device identifier;

means for selecting, based on the source device identifier of the particular source device that sent the data traffic, a particular data session identifier from the plurality of data session identifiers that can be associated only with the particular source device and not with any other device;

means for translating said native data session identifier to the particular data session identifier; and means for forwarding said data traffic including the particular data session identifier as the data session source device information to a service aggregation device;

wherein said native data session identifier comprises a source port number;

wherein said particular data session identifier comprises a port number.

10. An apparatus as recited in claim 9 further comprising means for using said data session source device information to identify a policy associated with a source device data session.

11. An apparatus as recited in claim 9 further comprising means for using the policy for one of assigning different QoS to different sessions, distinguishing between ISP's for respective source devices, security ACLs or media content control.

12. The apparatus of claim 9 further comprising means for translating said source device identifier to a translated source identifier as the source identifier.

13. The apparatus of claim 9, further comprising customer premises equipment.

14. The apparatus of claim 9, wherein the source identifier comprises a source device internet protocol (IP) address.

15. The apparatus of claim 9, wherein the data session comprises any one of: a transmission control protocol (TCP) connection; a simple control transport protocol (SCTP) association; and a universal datagram protocol (UDP) session.

16. The apparatus of claim 9, further comprising a community of source devices that comprises any one of a personal computer (PC); a voice over internet protocol (VoIP) phone; a set-top box; a security camera; a personal digital assistant (PDA) and a mobile telephone.

17. A computer-readable non-transitory storage medium storing one or more sequences of instructions for providing data session source device information, wherein execution of the one or more sequences of instructions by one or more processors causes the one or more processors to perform the steps of:

storing a plurality of data session identifiers that can be selected to be associated only with a particular source device and not with any other device;

receiving data traffic from the particular source device, said traffic comprising a native data session identifier and, as a source identifier, a source device identifier;

based on the source device identifier of the particular source device that sent the data traffic, selecting a particular data session identifier from the plurality of data session identifiers that can be associated only with the particular source device and not with any other device;

translating said native data session identifier to the particular data session identifier; and forwarding said data traffic including the particular data session identifier as data session source device information to a service aggregation device;

wherein said native data session identifier comprises a source port number;

wherein said particular data session identifier comprises a port number.

18. A computer-readable non-transitory storage medium as recited in claim 17, in which, by executing said instructions, said data session source device information is useable to identify a policy associated with a source device data session.

19. A computer-readable non-transitory storage medium as recited in claim 17, in which, by executing said instructions, the policy is used for one of assigning different QoS to different sessions, distinguishing between ISP's for respective source devices, security ACLs or media content control.

* * * * *